United States Patent
Tsujimoto

(10) Patent No.: US 9,667,827 B2
(45) Date of Patent: May 30, 2017

(54) IMAGE PROCESSING APPARATUS FOR TRANSMITTING IMAGE DATA BY SELECTIVELY USING FIRST AND SECOND PROTOCOLS

(71) Applicant: BROTHER KOGYO KABUSHIKI KAISHA, Nagoya-shi, Aichi-ken (JP)

(72) Inventor: Shohei Tsujimoto, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 15/080,855

(22) Filed: Mar. 25, 2016

(65) Prior Publication Data
US 2016/0286074 A1 Sep. 29, 2016

(30) Foreign Application Priority Data
Mar. 27, 2015 (JP) .................. 2015-066300

(51) Int. Cl.
H04N 1/32 (2006.01)
H04N 1/04 (2006.01)
H04N 1/00 (2006.01)

(52) U.S. Cl.
CPC ..... H04N 1/32117 (2013.01); H04N 1/00095 (2013.01); H04N 1/00217 (2013.01); H04N 1/00344 (2013.01); H04N 1/04 (2013.01); H04N 2201/0094 (2013.01)

(58) Field of Classification Search
CPC ........... H04N 1/32117; H04N 1/00095; H04N 1/00217; H04N 1/00344; H04N 1/04; H04N 2201/0094
See application file for complete search history.

(56) References Cited

U.S. PATENT DOCUMENTS

2011/0265144 A1* 10/2011 Ikeda .................... G06F 21/608
726/3

FOREIGN PATENT DOCUMENTS

JP 2005-328137 A 11/2005
JP 2011-232884 A 11/2011

* cited by examiner

*Primary Examiner* — Iriana Cruz
(74) *Attorney, Agent, or Firm* — Scully, Scott, Murphy & Presser, PC

(57) ABSTRACT

An image processing apparatus operates to perform: transmitting account information to the directory server through the communication interface for authentication by the directory server; receiving attribute information from the directory server when the account information is authenticated by the directory server, the attribute information being associated with the account information by the directory server and indicating a location in the network; transmitting image data, when the attribute information includes type-1 information, to the location indicated by the attribute information as a first destination using a first communication protocol indicated by the type-1 information; and transmitting image data, when the attribute information includes type-2 information, to the location indicated by the attribute information as a second destination that is different from the first destination using a second communication protocol indicated by the type-2 information, the second communication protocol being different from the first communication protocol.

15 Claims, 10 Drawing Sheets

FIG. 9

| WEB PAGE (wWWHomePage) \ HOME FOLDER (homeDirectory) | C1 (P1) "/" (FTP) | C2 (P2) "¥"or"\" (CIFS) | C3 NOT DESIGNATED |
|---|---|---|---|
| R1 (P3) "ftp://" (FTP) | FTP: PRIORITY TO P1<br>CIFS: −<br>HTTP: − | FTP: OPERATE WITH P3<br>CIFS: OPERATE WITH P2<br>HTTP: − | FTP: OPERATE WITH P3<br>CIFS: −<br>HTTP: − |
| R2 (P4) "file://" (CIFS) | FTP: OPERATE WITH P1<br>CIFS: OPERATE WITH P4<br>HTTP: − | FTP: −<br>CIFS: OPERATE WITH P2<br>HTTP: − | FTP: −<br>CIFS: OPERATE WITH P4<br>HTTP: − |
| R3 (P5) "http://" (HTTP) | FTP: −<br>CIFS: −<br>HTTP: OPERATE WITH P5 | FTP: −<br>CIFS: OPERATE WITH P2<br>HTTP: OPERATE WITH P5 | FTP: −<br>CIFS: −<br>HTTP: OPERATE WITH P5 |
| R4 NOT DESIGNATED | FTP: OPERATE WITH P1<br>CIFS: −<br>HTTP: − | FTP: −<br>CIFS: OPERATE WITH P2<br>HTTP: − | FTP: −<br>CIFS: −<br>HTTP: − |

IMAGE PROCESSING APPARATUS FOR TRANSMITTING IMAGE DATA BY SELECTIVELY USING FIRST AND SECOND PROTOCOLS

CROSS-REFERENCE TO RELATED APPLICATION

This application claims priorities from Japanese Patent Application No. 2015-066300 filed on Mar. 27, 2015, the entire subject matters of which is incorporated herein by reference.

TECHNICAL FIELD

The present disclosure relates to a technique for transmitting image data.

BACKGROUND

In the related art, various image processing apparatuses such as a scanner have been used. There have been proposed a technique for transmitting image data generated by a scanner to a home folder, which is set by a user, based on directory information acquired from an LDAP server.

However, there has not been sufficiently considered of a usage of an appropriate communication protocol for transmission of image data. This problem is limited to a case where the scanner is used for transmitting the image data, but is common to a case where various image processing apparatuses that transmit image data.

SUMMARY

The present disclosure has been made in view of the above circumstances, and one of objects of the present disclosure is to provide a technique capable of transmitting image data using an appropriate communication protocol.

According to an illustrative embodiment of the present disclosure, there is provided an image processing apparatus including: a communication interface that is connected to a network and communicates with a directory server through the network; a processor; and a memory storing computer-readable instructions that, when executed by the processor, causing the image processing apparatus to perform: transmitting account information to the directory server through the communication interface for authentication by the directory server; receiving attribute information from the directory server when the account information is authenticated by the directory server, the attribute information being associated with the account information by the directory server and indicating a location in the network; transmitting image data, when the attribute information includes type-1 information, to the location indicated by the attribute information as a first destination using a first communication protocol indicated by the type-1 information; and transmitting image data, when the attribute information includes type-2 information, to the location indicated by the attribute information as a second destination that is different from the first destination using a second communication protocol indicated by the type-2 information, the second communication protocol being different from the first communication protocol.

According to another illustrative embodiment of the present disclosure, there is provided an image processing apparatus including: a communication interface that is connected to a network and communicates with a directory server through the network; a processor; and a memory storing computer-readable instructions that, when executed by the processor, causing the image processing apparatus to perform: transmitting account information to a directory server through the communication interface for authentication by the directory server; transmitting, when the account information is authenticated by the directory server, at least one of a homeDirectory request and a wWWHomePage request to the directory server; receiving from the directory server, after transmitting at least one of the homeDirectory request and the wWWHomePage request, one or more pieces of attribute information associated with the account information and includes at least one of (1) a first character string indicating a location of a home folder on the network included in a response to the homeDirectory request and (2) a second character string indicating a location of a web page on the network included in a response to the wWWHomePage request; transmitting image data, when the attribute information includes type-1 information, to the location indicated by at least one of the first character string and the second character string as a first destination using a first communication protocol indicated by the type-1 information; and transmitting image data, when the attribute information includes type-2 information, to the location indicated by at least one of the first character string and the second character string as a second destination that is different from the first destination using a second communication protocol indicated by the type-2 information, the second communication protocol being different from the first communication protocol.

According to still another illustrative embodiment of the present disclosure, there is provided a non-transitory computer readable recording medium storing computer readable instructions for an information processing apparatus that is provided with a processor and a communication interface that is connected to a network and communicates with a directory server through the network. The instructions, when executed by the processor, cause the information processing apparatus to perform: transmitting account information to the directory server through the communication interface for authentication by the directory server; receiving attribute information from the directory server when the account information is authenticated by the directory server, the attribute information being associated with the account information by the directory server and indicating a location in the network; transmitting image data, when the attribute information includes type-1 information, to the location indicated by the attribute information as a first destination using a first communication protocol indicated by the type-1 information; and transmitting image data, when the attribute information includes type-2 information, to the location indicated by the attribute information as a second destination that is different from the first destination using a second communication protocol indicated by the type-2 information, the second communication protocol being different from the first communication protocol.

BRIEF DESCRIPTION OF THE DRAWINGS

In the accompanying drawings:

FIG. 9 is a table illustrating an algorithm of a profile preparing method; and

DETAILED DESCRIPTION

Figure 1:
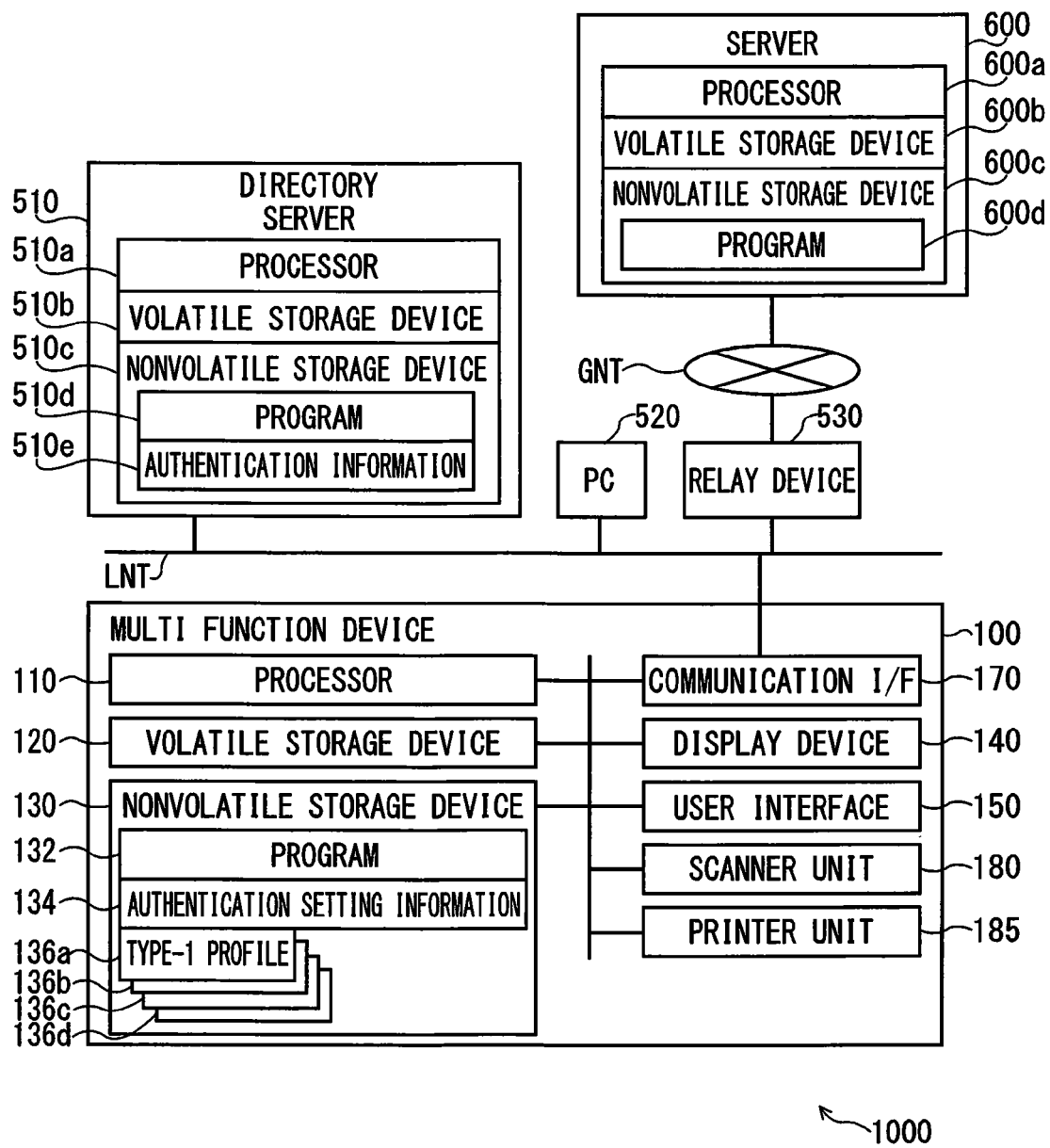
FIG. 1 is a diagram illustrating an image processing system according to an embodiment of the present disclosure.

FIG. 1 is a diagram illustrating an image processing system 1000 according to an embodiment of the present disclosure. The image processing system 1000 includes a multi function device 100, a directory server 510, and a personal computer 520 which are connected to an internal network LNT, a server 600 connected to an external network GNT, and a relay device 530 (a router in the embodiment) which connects the internal network LNT and the external network GNT.

The external network GNT is a network that is opened to public. An unspecified large number of devices may be connected to the external network GNT. In the embodiment, the external network GNT is the Internet.

The internal network LNT is a private network. Devices capable of being connected to the internal network LNT are limited by an administrator of the internal network LNT. The internal network LNT is a closed network in a local area such as a specific home and a specific company. The multi function device 100 belongs to the internal network LNT, but does not belong to the external network GNT.

The internal network LNT and the external network GNT are separated from each other by the relay device 530. The multi function device 100 communicates with the directory server 510 and the personal computer 520 via the internal network LNT. The multi function device 100 communicates with the server 600 connected to the external network GNT via the internal network LNT and the relay device 530.

The directory server 510 is a computer including a processor 510a, a volatile storage device 510b, and a nonvolatile storage device 510c. The processor 510a is a device that performs data processing and is, for example, a CPU. The volatile storage device 510b is, for example, a DRAM and the nonvolatile storage device 510c is, for example, a hard disk drive. The nonvolatile storage device 510c stores a program 510d and authentication information 510e.

The processor 510a of the directory server 510 enables various functions for a directory service by executing the program 510d. The directory service is a service of providing information on resources on a network. In the embodiment, the program 510d causes the processor 510a to serve as an LDAP server that provides information based on a lightweight directory access protocol (LDAP). The authentication information 510e is information which is used for the directory server 510 to authenticate a user. In the embodiment, the authentication information 510e includes a variety of information including user names, passwords, and a variety of attribute information associated with the user names.

The multi function device 100 includes a processor 110, a volatile storage device 120, a nonvolatile storage device 130, a display device 140 that displays an image, an user interface 150 that receives an operation from a user, a communication interface 170, a scanner unit 180, and a printer unit 185. These elements are connected to each other via a bus.

The processor 110 is a device that performs data processing and is, for example, a CPU. The volatile storage device 120 is, for example, a DRAM and the nonvolatile storage device 130 is, for example, a flash memory.

The nonvolatile storage device 130 stores a program 132, authentication setting information 134, and information indicating plural type-1 profiles 136a, 136b, 136c, and 136d. The processor 110 enables various functions (details of which will be described later) by executing the program 132. The processor 110 temporarily stores various intermediate data which are used to execute the program 132 in a storage device (for example, any one of the volatile storage device 120 and the nonvolatile storage device 130). In the embodiment, the program 132 is stored as firmware in advance in the nonvolatile storage device 130 by a manufacturer of the multi function device 100.

The authentication setting information 134 is information which is used for the directory server 510 to authenticate a user. The type-1 profiles 136a to 136d are information which is used for a process of transmitting image data. Details of the authentication setting information 134 and the type-1 profiles 136a to 136d will be described later.

The display device 140 is a device that displays an image and is, for example, a liquid crystal display. The user interface 150 is a device that receives an operation from a user and is, for example, a touch panel which is disposed to be superimposed on the display device 140. A user can input various instructions to the multi function device 100 by operating the user interface 150.

The communication interface 170 is an interface for communicating with another device (for example, a wired LAN interface or a wireless interface of IEEE 802.11). The internal network LNT is connected to the communication interface 170.

The scanner unit 180 generates scanned data representing a read image (referred to as a "scanned image") by optically reading an object such as an original document using a photoelectric conversion device such as a CCD or a CMOS. The scanned data is, for example, RGB bitmap data representing a color scanned image.

The printer unit 185 is a device that prints an image on a sheet (an example of a printing medium). In the embodiment, the printer unit 185 is an ink jet type printer using ink of cyan C, magenta R, yellow Y, and black K. Another type (for example, a laser type) of printer may be employed as the printer unit 185.

The multi function device 100 generates scanned data of an object by driving the scanner unit 180 in accordance with a user's instruction to optically read the object. The multi function device 100 is capable of transmitting the scanned data to another device (for example, the server 600). The multi function device 100 is also capable to control the printer unit 185 to print an image represented by the scanned data.

The server 600 is a computer including a processor 600a, a volatile storage device 600b, and a nonvolatile storage device 600c. The processor 600a is a device that performs data processing and is, for example, a CPU. The volatile storage device 600b is, for example, a DRAM and the nonvolatile storage device 600c is, for example, a hard disk drive. A program 600d is stored in the nonvolatile storage device 600c.

The processor 600*a* of the server 600 enables various functions for a service of storing data and reading the stored data by executing the program 600*d*. In the embodiment, the program 600*d* causes the processor 600*a* to realize a function of an FTP server transmitting data based on a file transfer protocol (FTP).

Although not illustrated, the personal computer 520 is also a computer including a processor (for example, a CPU) and a storage device.

Figure 2:
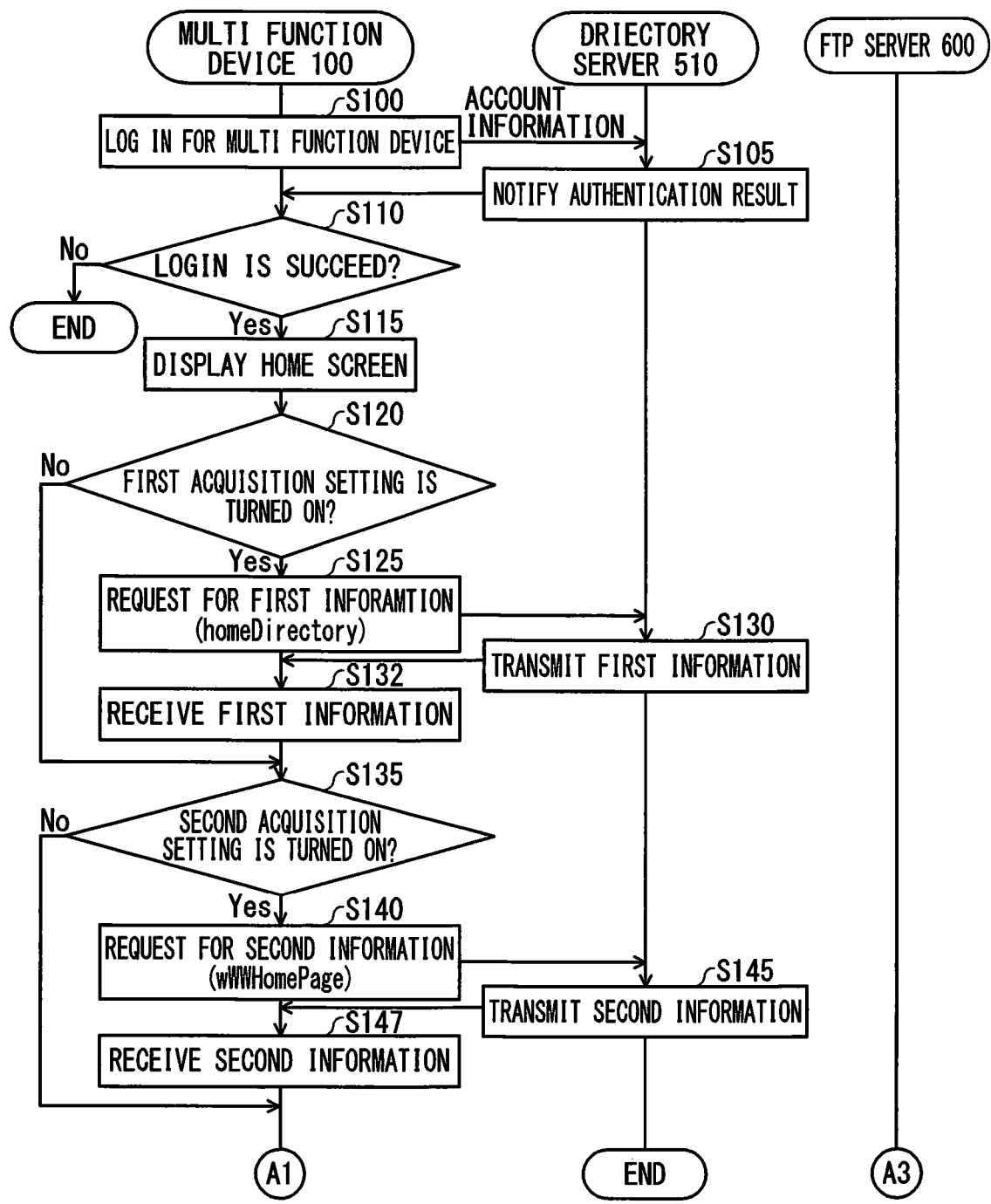
FIG. 2 is a flowchart illustrating an example of a process in the image processing system.
Figure 3:
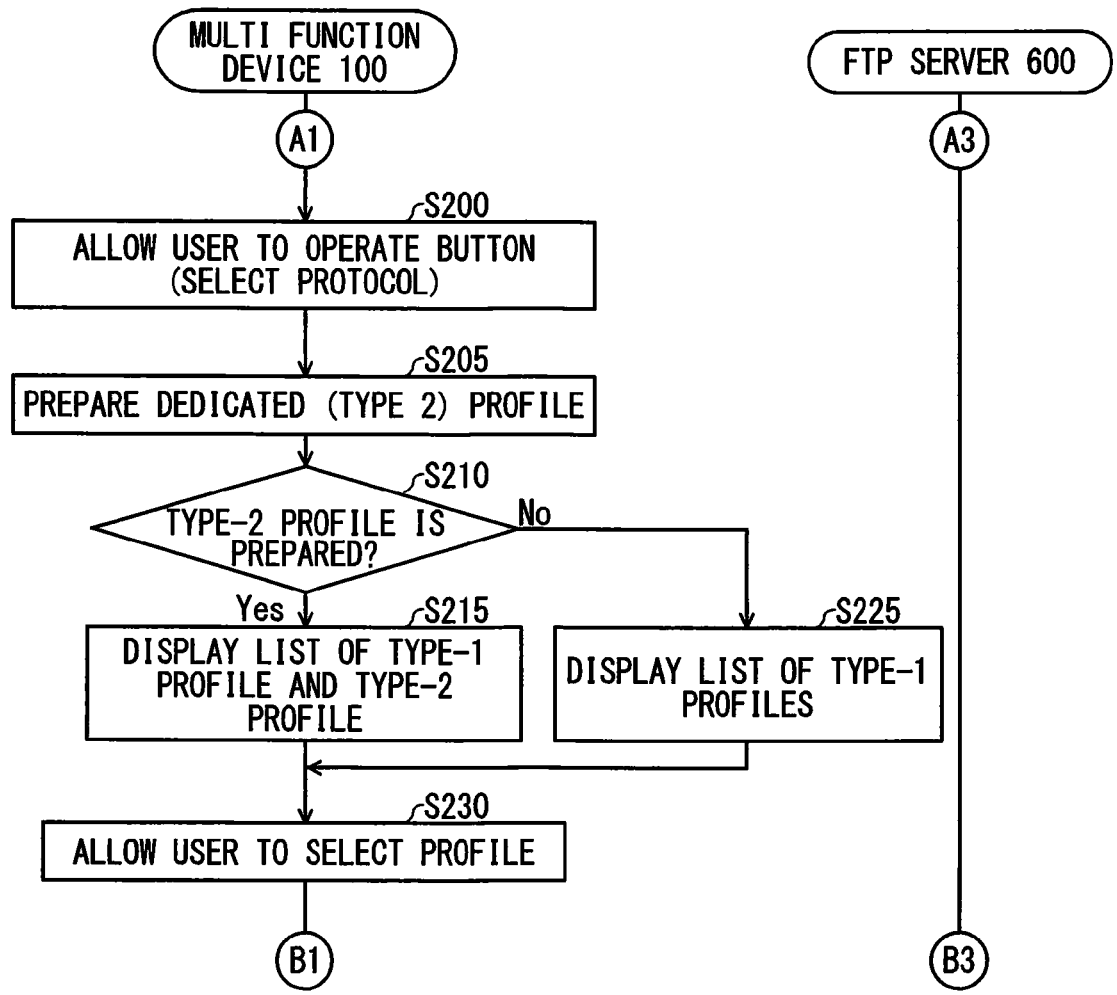
FIG. 3 is a flowchart illustrating an example of a process in the image processing system.
Figure 4:
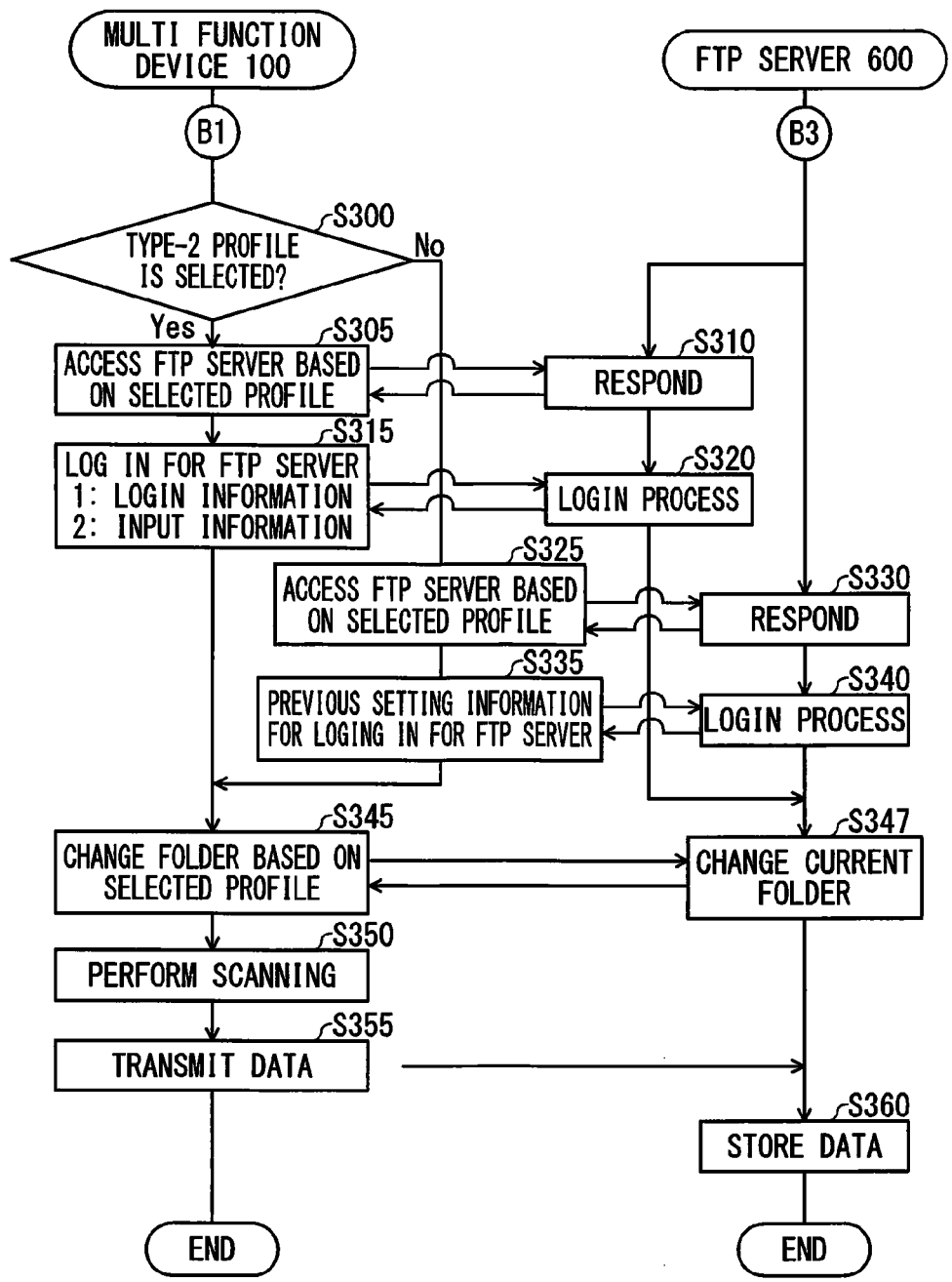
FIG. 4 is a flowchart illustrating an example of a process in the image processing system.

FIGS. 2, 3, and 4 are flowcharts illustrating an example of a process in the image processing system 1000. FIG. 3 illustrates a process subsequent to the process illustrated in FIG. 2, and FIG. 4 illustrates a process subsequent to the process illustrated in FIG. 3. In this process example, scanned data generated by the scanner unit 180 is transmitted to the server 600. In the drawings, a signal in which a letter "S" and a numeral subsequent to the letter "S" are combined is used as a sign denoting a process. In the drawings, the process of the multi function device 100, the process of the directory server 510, and the process of an external device (the FTP server 600 herein) are illustrated.

In S100, a user logs in for the multi function device 100 (FIG. 1). In the embodiment, the user inputs a user name and a password by operating the user interface 150 of the multi function device 100. The processor 110 of the multi function device 100 performs a process of authenticating the user based on the authentication setting information 134.

Figure 5:
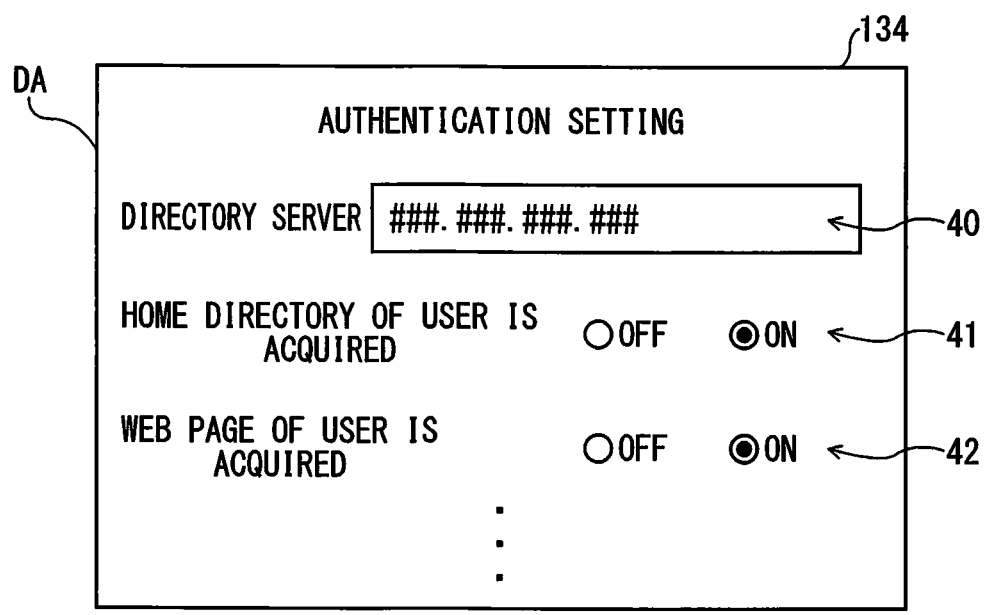
FIG. 5 is a diagram schematically illustrating an example of a setting screen of authentication setting information.

FIG. 5 is a diagram schematically illustrating an example of a setting screen of the authentication setting information 134. The setting screen DA is displayed on the display device 140 by allowing the user to operate the user interface 150 of the multi function device 100 (FIG. 1). In the example illustrated in FIG. 5, the setting screen DA includes an input box 40 of a network address of the directory server, a button 41 for turning "on" or "off" a first function of automatically acquiring information of a home directory of the user, and a button 42 for turning "on" or "off" a second function of automatically acquiring information of a web page of the user. An address of a directory server (the directory server 510 herein) which is used to authenticate the user is input to the input box 40. The first function and the second function are both set to "ON". The authentication setting information 134 includes information input via the setting screen DA. The first function and the second function will be described later.

In S100 of FIG. 2, the processor 110 of the multi function device 100 transmits account information including a user name and a password which have been input to the directory server 510 designated by the authentication setting information 134. For example, the processor 110 transmits an LDAP bind request including the account information to the directory server 510.

In S105, the processor 510*a* of the directory server 510 performs user authentication using the received user name and password and the authentication information 510*e* (FIG. 1). The authentication information 510*e* indicates a correlation between valid user names and passwords. The processor 510*a* determines whether the correlation between the received user name and password is valid with reference to the authentication information 510*e* and notifies the multi function device 100 of the determination result (that is, the authentication result).

Figure 6:
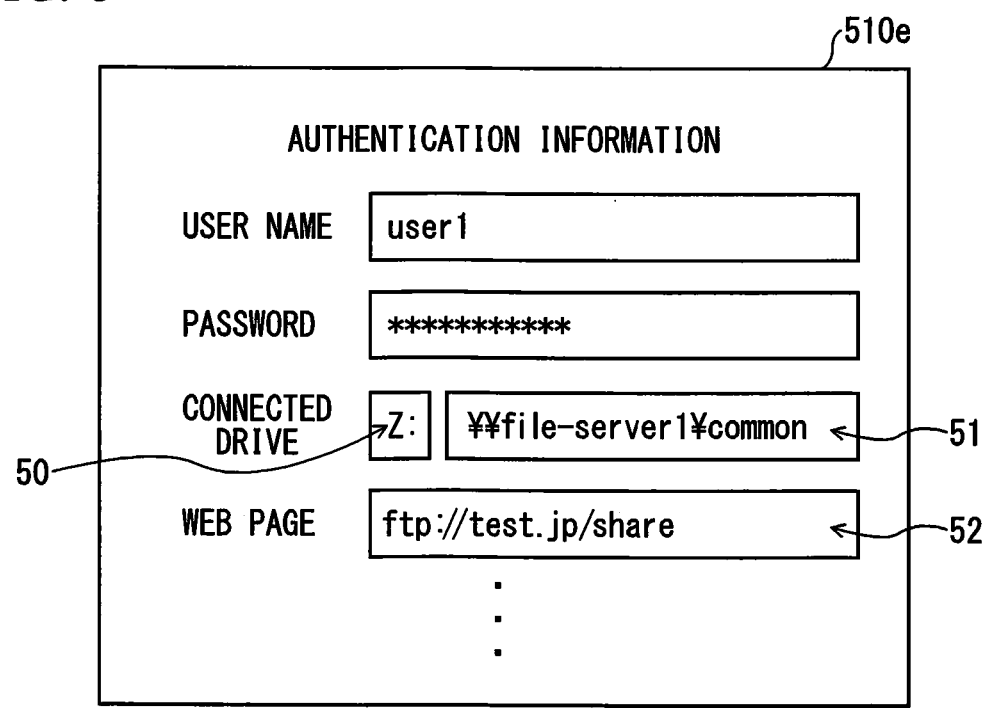
FIG. 6 is a diagram schematically illustrating an example of information indicated by authentication information.

FIG. 6 is a diagram schematically illustrating an example of information indicated by the authentication information 510*e*. In the drawing, an example of a part of the information corresponding to one user name is illustrated. In the example illustrated in FIG. 6, the authentication information 510*e* indicates a correlation among a "user name", a "password", a "connected drive", and a "web page". The "user name" and the "password" are referred to for the user authentication.

The "connected drive" indicates a location 51 of a home folder (also referred to as a home directory) on the network and a drive letter 50. In the example illustrated in FIG. 6, the location 51 on the network (hereinafter, also referred to as a "first location 51") is specified by a character string indicating a path which is expressed in the form of uniform naming convention (UNC). Such a path is expressed using "¥ (yen symbol)" or "\ (backslash)". For example, in a Japanese-environment system, a path is expressed using "¥ (yen symbol)". In a non-Japanese-environment system, a path can be expressed using "\ (backslash)". The drive letter 50 is used when the home folder is used as a network drive. In the embodiment, the directory server 510 returns a response including data representing the character string of the first location 51 to a request (for example, a LDAP search request designating attributes of "homeDirectory") from a device where user authentication was successful. The drive letter 50 is not used.

The "web page" indicates a location 52 of the web page on the network. In the example illustrated in FIG. 6, the location 52 on the network (hereinafter, also referred to as a "second location 52") is specified by a character string indicating a uniform resource locator (URL). The URL is expressed using a character string (for example, "ftp") indicating a communication scheme and "/ (slash)". The second location 52 is not limited to the URL of a web page to be merely read, but a URL which can be used in data transmission using a file transfer protocol (FTP) or the like can be designated. In the embodiment, the directory server 510 returns a response including data representing the character string of the second location 52 to a request (for example, a LDAP search request designating attributes of "wWWHomePage") from a device where user authentication was successful.

In the embodiment, as the first location 51 of the "connected drive", a URL including the scheme of FTP can also be set in addition to a path in the UNC format. The first location 51 of the "connected drive" and the second location 52 of the "web page" are examples of attribute information associated with a user name.

The authentication information 510*e* is determined in advance by an administrator of the directory server 510. The program 510*d* of the directory server 510 may be configured such that the processor 510*a* can change information associated with an authenticated user in response to a request from a device (for example, the personal computer 520) where user authentication was successful.

In S110 of FIG. 2, the processor 110 of the multi function device 100 determines whether authentication was successful with reference to the received notification (that is, the authentication result). When the authentication fails (NO in S110), the processor 110 does not allow login for the multi function device 100 and ends the process flow. When the authentication is successful (YES in S110), the processor 110 allows login for the multi function device 100 and performs the process of S115.

Figure 7A:
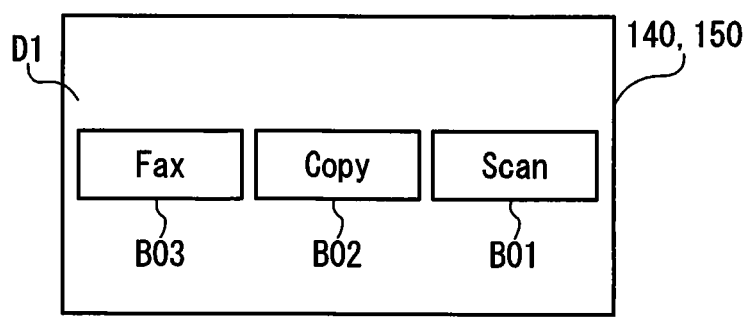
FIGS. 7A and 7B are diagrams schematically illustrating an example of a screen displayed on a display device.
Figure 7B:
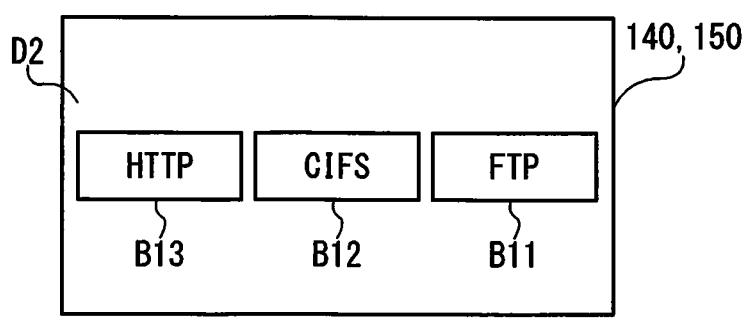

In S115, the processor 110 displays a home screen on the display device 140 (FIG. 1). FIGS. 7A and 7B are diagrams schematically illustrating an example of a screen displayed on the display device 140. FIG. 7A illustrates an example of a home screen. In the embodiment, the home screen D1 displays three buttons B01, B02, and B03. The first button B01 is a button for starting a "scanning" process, the second button B02 is a button for starting a "copying" process, and the third button B03 is a button for starting a "facsimile transmission" process. A user can operate a desired button by touching a position overlapping the desired button on the user interface 150.

In S120 of FIG. 2, the processor 110 determines whether setting for acquiring the first location 51 is turned on with reference to the authentication setting information 134 (FIG. 1) of the multi function device 100. This setting corresponds to setting by using the button 41 in FIG. 5. When the setting is turned "ON" (YES in S120), the processor 110 transmits a "homeDirectory" request to the directory server 510 in S125 (for example, an LDAP search request designating the attribute of "homeDirectory" is transmitted to the directory server 510). In S130, the processor 510a of the directory server 510 transmits a response including data representing a character string of the first location 51 (FIG. 6) of the home folder on the network to the multi function device 100 in response to the request. In S132, the processor 110 of the multi function device 100 receives the response from the directory server 510 and acquires the data representing the character string of the first location 51 of the home folder included in the received response. The data representing the character string of the first location 51 of the home folder is an example of first attribute information including the character string indicating the home folder. When the setting for acquiring the first location 51 is turned "OFF" (NO in S120), the processes of S125, S130, and S132 are skipped.

In S135, the processor 110 determines whether the setting for acquiring the second location 52 is turned on with reference to the authentication setting information 134 (FIG. 1) of the multi function device 100. This setting corresponds to setting by using the button 42 in FIG. 5. When the setting is turned "ON" (YES in S135), the processor 110 transmits a "wWWHomePage" request to the directory server 510 in S140 (for example, an LDAP search request designating the attribute of "wWWHomePage" is transmitted to the directory server 510). In S145, the processor 510a of the directory server 510 transmits a response including data representing a character string of the second location 52 (FIG. 6) of the web page on the network to the multi function device 100 in response to the request. In S147, the processor 110 of the multi function device 100 receives the response from the directory server 510 and acquires the data representing the character string of the second location 52 of the web page included in the received response. The data representing the character string of the second location 52 of the web page is an example of second attribute information including the character string indicating the web page. When the setting for acquiring the second location 52 is turned "OFF" (NO in S135), the processes of S140, S145, and S147 are skipped.

In S200 of FIG. 3, the user operates the screen displayed on the display device 140 (FIG. 1). Here, it is assumed that the user operates the first button B01 on the home screen D1 (FIG. 7A). In the embodiment, the first button B01 is associated with a process of transmitting scanned data to a device other than the multi function device 100. When the first button B01 is operated, the processor 110 displays a selection screen D2 illustrated in FIG. 7B on the display device 140. The selection screen D2 is a screen for selecting a communication protocol which is used to transmit the scanned data. The selection screen D2 displays three buttons B11, B12, and B13. The first button B11 is a button for selecting "FTP", the second button B12 is a button for selecting "common Internet file system (CIFS)", and the third button B13 is a button for selecting "hypertext transfer protocol (HTTP)".

In S200, the user selects one communication protocol from the communication protocols. Hereinafter, it is assumed that "FTP" is selected.

Figure 8A:
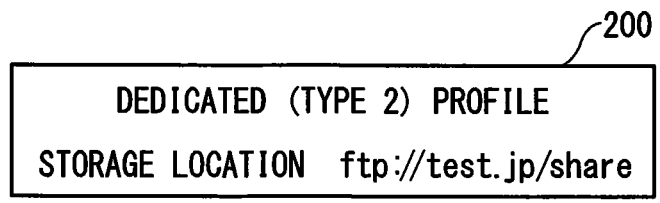
FIGS. 8A, 8B, and 8C are diagrams schematically illustrating profiles.
Figure 8B:
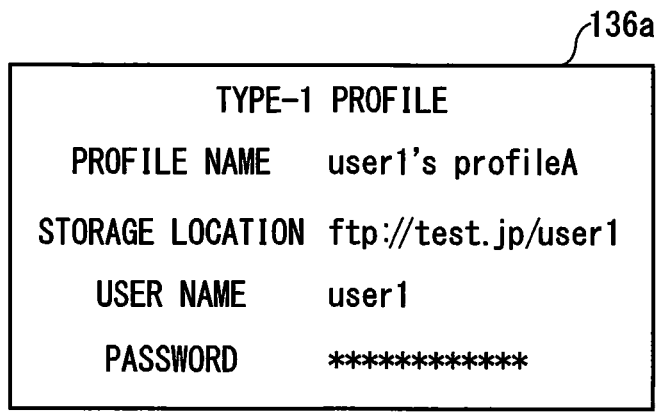
Figure 8C:
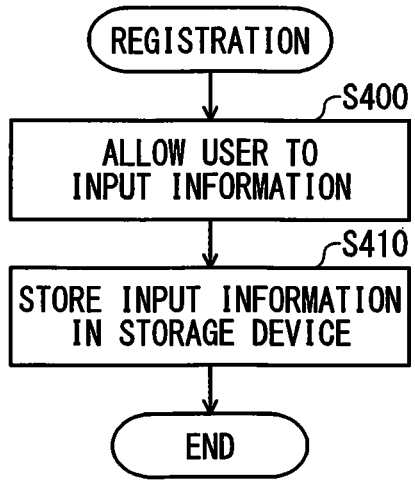

In S205, the processor 110 prepares a profile based on the selected communication protocol. FIGS. 8A, 8B, and 8C are diagrams schematically illustrating profiles. FIG. 8A illustrates an example of a profile which is prepared in S205. The profile utilizes plural types of settings (for example, including a destination and a communication protocol) which are used in one process of transmitting scanned data. At least a part of various settings such as a server of a destination, a folder of a destination, and a communication protocol may differ depending on the plural profiles. The profile 200 illustrated in FIG. 8A indicates that the storage location (that is, a destination) of the scanned data is "ftp://test.jp/share". This storage location corresponds to the second location 52 of the web page in FIG. 6.

FIG. 9 is a table illustrating an algorithm of a profile preparing method in S205 of FIG. 3. In the embodiment, the processor 110 searches the character string of the "home folder" (that is, the character string of the first location 51 in FIG. 6) and the character string of the "web page" (that is, the character string of the second location 52 in FIG. 6) for a predetermined character string and specifies a keyword included in the character string of the "home folder" and a keyword included in the character string of the "web page". In the embodiment, the character string of the "home folder" is searched for "/", "¥", and "\" and the character string of the "web page" is searched for "ftp://", "file://", and "http://". The processor 110 determines a profile based on a combination of the keyword included in the character string of the "home folder", the keyword included in the character string of the "web page", and the communication protocol selected in S200 of FIG. 3.

Three columns C1 to C3 in the table illustrated in FIG. 9 indicate three types of "home folders" which are classified based on the keyword included in the character string of the "home folder". A type-1 home folder P1 in the first column C1 indicates a home folder including "/ (slash)", a type-2 home folder P2 in the second column C2 indicates a home folder including "¥ (yen symbol)" or "\ (backslash)", and a type 3 home folder in the third column C3 indicates a home folder not including the keywords. In the embodiment, the type-1 home folder P1 is treated as a destination using the FTP, and the type-2 home folder P2 is treated as a destination using the CIFS.

Four rows R1 to R4 in the table illustrated in FIG. 9 indicate four types of "web pages" which are classified based on the keyword included in the character string of the "web page". A type-1 web page P3 in the first row R1 indicates a web page including "ftp:// (a scheme of the FTP)". A type-2 web page P4 in the second row R2 indicates a web page including "file:// (a scheme of referring to a file system)". A type 3 web page P5 in the third row R3 indicates a web page including "http:// (a scheme of the HTTP)". A type 4 web page in the fourth row R4 indicates a web page not including the keywords. In the embodiment, the type-1 web page P3 is treated as a destination using the FTP, the type-2 web page P4 is treated as a destination using the CIFS, and the type 3 web page P5 is treated as a destination using the HTTP.

A cell at which one row and one column intersect each other in the table illustrated in FIG. 9 indicates a correlation between the communication protocol selected in S200 of FIG. 3 and the destination used to transmit the scanned data. For example, in the example illustrated in FIG. 6, since the first location 51 is the type-2 home folder P2 and the second location 52 is the type-1 web page P3, the profile is determined based on the prescription of a cell CL1 in FIG. 9. In the cell CL1, the "FTP" is associated with the type-1 web page P3, the "CIFS" is associated with the type-2 home folder P2, and the "HTTP" is not associated with the destination. In S200 of FIG. 3, when the "FTP" is selected, the type-1 web page P3 (the second location 52 in FIG. 6) is employed as a destination. The profile 200 in FIG. 8A is a profile which is prepared in this case. When the "CIFS" is selected, the type-2 home folder P2 (the first location 51 in FIG. 6) is employed as a destination.

In the example illustrated in FIG. 9, in general, the processor 110 employs the destination associated with the communication protocol selected in S200 (FIG. 3) among the "home folder" and the "web page". As indicated by the cells CL2 and CL3, when the "home folder" and the "web page" include information indicating the same communication protocol, the processor 110 employs the "home folder" as a destination instead of the "web page". In S205, the processor 110 generates a profile indicating the employed destination.

In the embodiment, when the communication protocol selected in S200 of FIG. 3 is not relevant to both the "home folder" and the "web page", the processor 110 does not generate a profile. "- (hyphen)" in the cells of the table illustrated in FIG. 9 indicates that a profile is not generated when the corresponding communication protocol is selected. For example, when the process is carried out based on the cell CL1 and the "HTTP" is selected, a profile is not generated.

Hereinafter, the profile prepared in S205 of FIG. 3 is also referred to as a "dedicated profile" or a "type-2 profile". The type-1 profiles 136a to 136d stored in the nonvolatile storage device 130 (FIG. 1) can also be used as the profile indicating a destination. FIG. 8B is a diagram schematically illustrating an example of the type-1 profile. The type-1 profile 136a indicates a profile name, a storage location of data (that is, a destination), a user name, and a password. The user name and the password are information for acquiring permission of access to the storage location. In the example illustrated in FIG. 8B, the profile name is "user1's profileA", the storage location is "ftp://test.jp/user1", and the user name is "user1". A URL of a scheme different from the FTP can be used as the storage location and a path in the UNC format can be used.

FIG. 8C is a flowchart illustrating a process flow of registering a type-1 profile in the multi function device 100. A user can register the type-1 profile in the multi function device 100 in accordance with the flow illustrated in FIG. 8C by operating the multi function device 100 in advance. The process flow illustrated in FIG. 8C is performed independently of the process flows illustrated in FIGS. 2 to 4. In S400, the user inputs information of a type-1 profile such as the "profile name", a "storage location", a "user name", and a "password" which have been described above with reference to FIG. 8B by operating the user interface 150. In S410, the processor 110 stores data representing the input type-1 profile in the nonvolatile storage device 130. The profile name is used to identify the type-1 profile.

In S210 of FIG. 3, the processor 110 determines whether a type-2 profile is generated in S205. When the type-2 profile is generated (YES in S210), the processor 110 displays the type-2 profile and a list of type-1 profiles stored in the nonvolatile storage device 130 (FIG. 1) on the display device 140 in S215. In the embodiment, the processor 110 displays a profile in which the communication protocol corresponds to the communication protocol selected in S200 of FIG. 3 among the plural type-1 profiles stored in the nonvolatile storage device 130 on the display device 140.

Figure 10A:
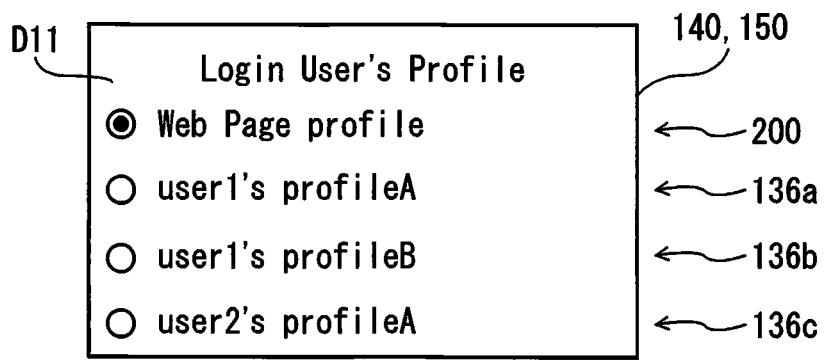
FIGS. 10A and 10B are diagrams illustrating an example of a screen displaying a list of profiles.
Figure 10B:
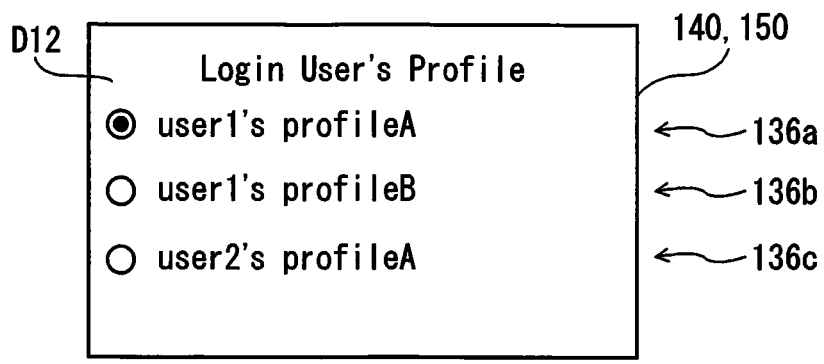

FIGS. 10A and 10B are diagrams schematically illustrating examples of a screen displaying a list of profiles. FIG. 10A illustrates a screen example displayed in S215 of FIG. 3. In this screen D11, a name of the type-2 profile 200 and names of the type-1 profiles 136a to 136c. In the embodiment, the name of the type-2 profile indicates one corresponding to the type-2 profile among the "home folder" and the "web page". Here, it is assumed that the "FTP" is selected in S200 of FIG. 3 and the type-2 profile 200 in FIG. 8A indicating the destination of the "web page" is generated as the type-2 profile. It is also assumed that the protocols of the profiles 136a to 136c among the type-1 profiles 136a to 136d stored in the nonvolatile storage device 130 (FIG. 1) are the "FTP" and the protocol of the profile 136d is "except FTP (for example, HTTP)". Since the protocol of the profile 136d is not the "FTP", the name of the profile 136d is not displayed.

When the type-2 profile is not generated (NO in S210), the processor 110 displays the list of type-1 profiles on the display device 140 in S225. FIG. 10B illustrates a screen example displayed in S225. In this screen D12, names of the type-1 profiles 136a to 136c are displayed. The information displayed in the screen D12 is the same as the information displayed in the screen D11 of FIG. 10A, except that information indicating the type-2 profile is not displayed.

After S215 or S225 of FIG. 3, the user selects one profile among the displayed profiles in S230. The user can select a desired profile by touching a position superimposed on the desired profile on the user interface 150.

In S300 of FIG. 4, the processor 110 of the multi function device 100 determines whether the type-2 profile is selected in S230 of FIG. 3. When the type-2 profile is selected (YES in S300), the processor 110 requests the server of the destination to start communication based on the selected profile in S305. Here, it is assumed that the type-2 profile 200 illustrated in FIG. 8A is selected and the server of the destination is the server 600. In S310, the processor 600a of the server 600 starts communication in response to the request.

In S315, the processor 110 of the multi function device 100 logs in for the server 600. At this time, the processor 110 transmits login information (that is, the user name and the password) input in S100 of FIG. 2 to the server 600. In S320, the processor 600a of the server 600 performs user authentication using the received user name and password and transmits the authentication result to the multi function device 100. When the authentication fails, the processor 110 of the multi function device 100 displays a screen for inputting a user name and a password on the display device 140 (not illustrated). Then, the processor 110 logs in for the server 600 by transmitting the user name and the password input by the user to the server 600.

When the type-2 profile is not selected (NO in S300), that is, when the type-1 profile is selected, the processor 110 of the multi function device 100 requests the server of the destination to start communication based on the selected profile in S325. Here, it is assumed that the type-1 profile 136a illustrated in FIG. 8B is selected and the server of the destination is the server 600. In S330, the processor 600a of the server 600 starts communication in response to the request.

In S335, the processor 110 of the multi function device 100 logs in for the server 600. At this time, the processor 110 transmits the user name and password which are predetermined by the selected type-1 profile (for example, the type-1 profile 136a in FIG. 8B) to the server 600. In S340, the processor 600a of the server 600 performs the user authentication using the received user name and the password and transmits the authentication result to the multi function device 100.

After S315 or S335, the processor 110 of the multi function device 100 transmits a request for changing a current folder to a folder of the destination determined by the selected profile to the server 600 in S345. In S347, the processor 600a of the server 600 changes the current folder in response to the request. In S350, the processor 110 of the multi function device 100 generates scanned data by controlling the scanner unit 180. In S355, the processor 110 transmits the generated scanned data to the server of the destination (the server 600 herein). In S360, the processor 600a of the server 600 stores the received scanned data in the nonvolatile storage device 600c. The storage location of the stored scanned data is the current folder, that is, the storage location determined by the selected profile. In this way, the process illustrated in FIGS. 2 to 4 are completed.

The case in which the "FTP" is selected in S200 of FIG. 3 has been described hitherto, but even when a protocol other than the "FTP" is selected, the processor 110 of the multi function device 100 transmits scanned data to a device of a destination in accordance with the same order as illustrated in FIG. 4. In this case, the device of the destination in the profile selected as a device corresponding to the selected protocol performs the processes (for example, S310, S320, S330, S340, S347, and S360) of the server 600 in FIG. 4 instead of the server 600. The login for the device of the destination (for example, S305 to S320 and S325 to S340), change of the folder (for example, S345 and S347), and transmission of scanned data (for example, S355 and S360) are performed in accordance with the communication protocol (the same as the communication protocol selected in S200 herein) associated with the profile selected in S230 of FIG. 3. For example, when the "CISF" is selected in S200 of FIG. 3 and the process is performed based on the cell CL1 in FIG. 9, the processor 110 of the multi function device 100 transmits scanned data to the destination of the type-2 home folder P2 in accordance with the CIFS. This destination may be another device (for example, the personal computer 520 (FIG. 1)) other than the server 600. The process flow illustrated in FIG. 4 is appropriately corrected depending on the selected communication protocol.

As described in S205 of FIG. 2, the type-2 profile indicates a destination indicated by the attribute information (specifically, the "home folder" or the "web page"). Accordingly, the type-2 profile can be said to be a type of attribute information. As illustrated in FIGS. 8B and 8C, the type-1 profile is information which indicates a destination similarly to the type-2 profile and which is input by a user. Accordingly, the type-1 profile can be said to be a type of attribute information. In the embodiment, the type-1 profile stored in the nonvolatile storage device 130 can be commonly used by users who succeed in user authentication in S100 to S110 of FIG. 2. The user who can use the type-1 profile may be limited to the user having generated the profile.

As described above, in the embodiment, the processor 110 of the multi function device 100 transmits the account information to the directory server 510 (S100 of FIG. 2), and receives attribute information (the "home folder" and the "web page" herein) associated with the authenticated account information from the directory server 510 (S132 and S147 of FIG. 2). As illustrated in FIG. 9, the processor 110 uses the attribute information (the type-1 home folder P1 or the type-1 web page P3 herein) including the character string associated with the FTP and transmits scanned data to the destination indicated by the attribute information in accordance with the FTP. The processor 110 uses the attribute information (the type-2 home folder P2 or the type-2 web page P4 herein) including the character string associated with the CIFS and transmits scanned data to the destination indicated by the attribute information in accordance with the CIFS. The processor 110 uses the attribute information (the type 3 web page P5 herein) including the character string associated with the HTTP and transmits scanned data to the destination indicated by the attribute information in accordance with the HTTP. In this way, when the scanned data is transmitted using the attribute information associated with the authenticated account information, plural communication protocols can be used and it is thus possible to transmit image data to a destination indicated by the attribute information in accordance with an appropriate communication protocol.

The "home folder" and the "web page" are used as the attribute information. Accordingly, the processor 110 of the multi function device 100 can transmit the scanned data in accordance with an appropriate communication protocol using the "home folder" and the "web page".

When the account information is authenticated by the directory server 510 (YES in S110 of FIG. 2), the processor 110 of the multi function device 100 transmits a homeDirectory request and a wWWHomePage request to the directory server 510 (S125 and S140). Then, the processor 510 receives attribute information including a character string indicating a home folder included in a response to the homeDirectory request and attribute information including a character string indicating a web page included in a response to the wWWHomePage request (S132 and S147). Accordingly, the processor 110 can transmit image data in accordance with an appropriate protocol using the character string included in the responses to the requests.

As described with reference to FIG. 9, when the "home folder" and the "web page" include the information associated with the same communication protocol, the processor 110 employs the "home folder" instead of the "web page" as the destination. Accordingly, when scanned data is transmitted to the destination indicated by the "home folder", the processor 110 can transmit the scanned data in accordance with an appropriate communication protocol.

As described with reference to FIG. 9, the attribute information (the type-1 home folder P1 and the type-1 web page P3 herein) including the character string associated with a file transfer service like the FTP can be used as attribute information. The attribute information (the type-2 home folder P2 and the type-2 web page P4 herein) including the character string associated with a file sharing service like the CIFS can be used as attribute information. Accordingly, the processor 110 can transmit scanned data in accordance with an appropriate communication protocol using the attribute information including a keyword indicating the file transfer service and the attribute information including a keyword indicating the file sharing service.

As described with reference to FIG. 9, when any one of the "type-2 home folder P2" including any of the "¥ (yen symbol)" and the "\ (backslash)" and the "type-2 web page P4" including "file://" is used, the processor 110 uses the CIFS as the communication protocol. When any of the "type-1 home folder P1" including the "/(slash)" and the "web pages P3 and P5" including any of "ftp://" and "http://" is used, the processor 110 uses a communication protocol (the FTP or the HTTP herein) other than the CIFS. Accordingly, the processor 110 can transmit the scanned data in accordance with a communication protocol suitable for the character or character string included in the attribute information.

As described in S215 of FIG. 3, the processor 110 displays the attribute information (specifically, the name of the profile generated based on the attribute information) corresponding to the communication protocol selected by the user among two types of attribute information (the "home folder" and the "web page" herein) received from the directory server 510 on the display device 140. Then, the processor 110 transmits the scanned data to the destination using the profile selected by the user. Accordingly, the processor 110 can realize transmission of the scanned data suitable for the attribute information selected by the user. The processor 110 can appropriately transmit the scanned data in accordance with the communication protocol selected by the user.

As described in S215 of FIG. 3, the processor 110 displays the type-1 profile corresponding to the communication protocol selected by the user among the type 1 protocols stored in the nonvolatile storage device 130 on the display device 140. Accordingly, the processor 110 can realize transmission of the scanned data suitable for the profile selected by the user among one or more profiles including the profile input by the user. The processor 110 can appropriately transmit the scanned data in accordance with the communication protocol selected by the user.

As described with reference to FIG. 1, the multi function device 100 includes the scanner unit 180 that generates scanned data representing an original document by optically reading the original document. The processor 110 transmits the scanned data generated by the scanner unit 180 to a destination (S350 and S355 of FIG. 4). Accordingly, the processor 110 can transmit the scanned data in accordance with an appropriate communication protocol.

Next, some modifications of the embodiment will be described.

(1) Another arbitrary directory server instead of the LDAP server may be employed as the directory server providing attribute information associated with a user. For example, the directory server may perform user authentication and provision of attribute information associated with the authenticated user in accordance with independent communication protocols.

(2) Another arbitrary attribute information instead of the "home folder" and the "web page" may be employed as the attribute information indicating a destination. For example, attribute information having an independent name may be employed. In any case, only one of the homeDirectory request and the wWWHomePage request may be used as a request for acquiring the attribute information indicating a destination. Another arbitrary request capable of acquiring target attribute information may be employed instead of the homeDirectory request and the wWWHomePage request.

(3) In the algorithm described with reference to FIG. 9, when the "home folder" and the "web page" include the same type of information (that is, information indicating the same communication protocol), the "home folder" instead of the "web page" is employed as the destination. Instead, the "web page" instead of the "home folder" may be employed as the destination.

When both the "home folder" and the "web page" indicate the destination in the communication protocol selected in S200 of FIG. 3, the processor 110 may generate both a type-2 profile corresponding to the "home folder" and a type-2 profile corresponding to the "web page" in S205. In S215, the processor 110 may display both of the two generated type-2 profiles on the display device 140.

(4) The communication protocol which can be used to transmit data is not limited to three types of the "FTP", the "CIFS", and the "HTTP", but two or more arbitrary communication protocols may be employed. For example, two or more communication protocols arbitrarily selected from "FTP", "FTPS", "SFTP", "HTTP", "HTTPS", "CIFS", and "SMB" may be employed. According to this configuration, the processor 110 can appropriately transmit scanned data using two or more communication protocols. It is preferable that the communication protocol which can be used to transmit data include the communication protocol (for example, any of the "FTP", the "FTPS", and the "SFTP") for the file transfer service and the communication protocol (for example, any of the "CIFS" and the "SMB") for the file sharing service.

When a character string indicating a destination includes at least one of the "¥ (yen symbol)", the "\ (backslash)", and the "file://", the destination can be said to be a destination of the file sharing service. When a character string indicating a destination includes at least one of "/" (here, "/" when the character string includes "file://" is excluded), "ftp://", "ftps://", "sftp://", "http://", and "https://", the destination can be said to be a destination of a service other than the file sharing service. For example, when the character string indicating a destination includes any of "ftp://", "ftps://", and "sftp://", the destination can be said to be a destination of the file transfer service. When the character string indicating a destination includes any of "http://" and "https://", the destination can be said to be a destination of one type of web service.

The processor 110 of the multi function device 100 can specify a communication protocol associated with a destination based on the keyword included in the destination. When data is transmitted to the destination, the processor 110 can transmit data in accordance with the specified communication protocol.

(5) As a process of transmitting scanned data, various processes may be employed instead of the process described with reference to FIGS. 2 to 4. For example, the selection screen D2 illustrated in FIG. 7B may be omitted. In this case, when the first button B01 for scanning in FIG. 7A is operated, a communication protocol is not selected in S200 of FIG. 3. In S205, the processor 110 can generate both the type-2 profile corresponding to the "home folder" and the type-2 profile corresponding to the "web page" regardless of the communication protocol. In S215, the processor 110 can display plural profiles including the generated two type-2 profiles on the display device 140. Here, the processor 110 may display all of available type-1 profiles on the display device 140 regardless of the communication protocol. Instead, the processor 110 may display a profile in which the communication protocol is equal to the communication protocol of at least one of the type-2 profiles among the available type-1 profiles. For example, when the communication protocol of the "home folder" is the "CIFS" and the communication protocol is the "FTP", the type-1 profile of the "HTTP" may not be displayed and the type-1 profile of the "CIFS" and the type-1 profile of the "FTP" may be displayed.

The type-1 profile may be omitted. In this case, S210 and S225 of FIG. 3 are omitted. In S215, the generated type-2 profile is displayed on the display device 140.

(6) Another type of device other than the multi function device 100 may be employed as the image processing apparatus that transmits image data such as scanned data. For example, a digital camera or a mobile terminal with a camera may transmit image data representing a captured image to a destination in the same flowcharts as illustrated in FIGS. 2 to 4. Plural devices (for example, computers) that can communicate with each other via a network may take charge of parts of the image processing function of the image processing apparatus and may provide the image processing function as a whole (a system including the devices corresponds to the image processing apparatus).

As a configuration of the image processing system including the image processing apparatus, various other configurations may be employed instead of the configuration illustrated in FIG. 1. For example, the directory server 510 may be connected to the external network GNT. The server 600 may be connected to the internal network LNT.

In the above-mentioned examples, a part of configurations which are embodied by hardware may be replaced with software. On the other hand, a part or all of configurations which are embodied by software may be replaced by hardware. For example, the function of realizing at least a part of the processes of the multi function device 100 illustrated in FIGS. 2 to 4 may be embodied by dedicated hardware circuits.

When a part or all of the functions of the present disclosure are embodied by a computer program, the program may be provided in a state in which the program is stored in a computer-readable recording medium (for example, a non-transitory recording medium). The program may be used in a state in which the program is stored in the recording medium (computer-readable recording medium) equal to or different from that at the time of provision. The "computer-readable recording medium" is not limited to a portable recording medium such as a memory card or a CD-ROM, but may include an internal storage device in a computer such as various ROMS or an external storage device connected to a computer such as a hard disk drive.

While the present disclosure has been described above with reference to the examples and the modified examples, the above-mentioned examples of the present disclosure are provided to facilitate understanding of the present disclosure, but are not provided to limit the present disclosure. The present invention can be modified and improved without departing from the gist and scope of the appended claims, and equivalents thereof belong to the present disclosure.

What is claimed is:

1. An image processing apparatus comprising:
   a communication interface that is connected to a network and communicates with a directory server through the network;
   a display device;
   a storage device;
   a processor; and
   a memory storing computer-readable instructions that, when executed by the processor, causing the image processing apparatus to perform:
      receiving user attribute information input by the user;
      storing the user attribute information in the storage device;
      transmitting account information to the directory server through the communication interface for authentication by the directory server;
      receiving a plurality of pieces of attribute information from the directory server when the account information is authenticated by the directory server, each of the plurality of pieces of attribute information being associated with the account information by the directory server and indicating a location in the network;
      displaying, on the display device, a protocol selection screen for selecting a communication protocol which is used to transmit image data to a destination;
      displaying, on the display device, an attribute information selection screen for selecting attribute information, wherein the attribute information selection screen includes a plurality of pieces of target attribute information, which is a plurality of pieces of attribute information associated with the communication protocol selected from the protocol selection screen among a plurality of pieces of candidate attribute information including the plurality of pieces of attribute information received from the directory server and the user attribute information stored in the storage device, and does not include attribute information associated with a communication protocol which is different from the communication protocol selected from the protocol selection screen among the plurality of pieces of candidate attribute information;
      in a case where the communication protocol selected from the protocol selection screen is a first communication protocol which is indicated by type-1 information, transmitting image data to the location which is indicated by target attribute information selected from the attribute information selection screen and including the type-1 information as a first destination using the first communication protocol, and not transmitting the image data to the location which is indicated by the target attribute information as the first destination using a second communication protocol, the second communication protocol being indicated by type-2 information different from the type-1 information and being different from the first communication protocol; and
      in a case where the communication protocol selected from the protocol selection screen is the second communication protocol, transmitting image data to the location which is indicated by target attribute information selected from the attribute information selection screen and including the type-2 information as a second destination that is different from the first destination using the second communication protocol, and not transmitting the image data to the location which is indicated by the target attribute information as the second destination using the first communication protocol.

2. The image processing apparatus according to claim 1, wherein the location indicated by the attribute information includes at least one of a location of a home folder and a location of a web page.

3. The image processing apparatus according to claim 2, wherein the memory stores the computer readable instructions that, when executed by the processor, further causing the image processing apparatus to perform:
   transmitting, when the account information is authenticated by the directory server, at least one of a homeDirectory request and a wWWHomePage request to the directory server,
   wherein the receiving the plurality of pieces of attribute information includes receiving, after transmitting at least one of the homeDirectory request and the wWWHomePage request, a character string indicating at least one of the location of the home folder included in a response to the homeDirectory request from the directory server and the location of the web page included in a response to the wWWHomePage request from the directory server.

4. The image processing apparatus according to claim 2, wherein the receiving the plurality of pieces of attribute information includes receiving first attribute information including a character string indicating the location of the home folder and second attribute information including a character string indicating the location of the web page, and
wherein the transmitting the image data includes:
determining whether the first attribute information and the second attribute information include the same type of information among the type-1 information and the type-2 information; and
transmitting the image data to the location of the home folder indicated by the character string, without transmitting the image data to the location of the web page indicated by the character string, in response to determined that the first attribute information and the second attribute information include the same type of information among the type-1 information and the type-2 information.

5. The image processing apparatus according to claim 1, wherein the type-1 information is information indicating a file transfer service, and
wherein the type-2 information is information indicating a file sharing service.

6. The image processing apparatus according to claim 1, wherein the type-1 information includes at least one character string of "/(slash)", "ftp://", "ftps://", "sftp://", "http://", and "https://", and
wherein the type-2 information includes at least one character string of "¥ (yen symbol)", "\ (backslash)", and "file://".

7. The image processing apparatus according to claim 1, wherein the first communication protocol includes at least one communication protocol of "FTP", "FTPS", "SFTP", "HTTP", "HTTPS", "CIFS", and "SMB", and
wherein the second communication protocol includes at least one communication protocol other than the first communication protocol out of the seven communication protocols.

8. The image processing apparatus according to claim 1 further comprising:
a scanner unit that optically scans a document and generates image data representing the document,
wherein the transmitting the image data includes transmitting the image data generated by the scanner unit.

9. An image processing apparatus comprising:
a communication interface that is connected to a network and communicates with a directory server through the network;
a display device;
a storage device;
a processor; and
a memory storing computer-readable instructions that, when executed by the processor, causing the image processing apparatus to perform:
receiving user attribute information input by the user;
storing the user attribute information in the storage device;
transmitting account information to a directory server through the communication interface for authentication by the directory server;
transmitting, when the account information is authenticated by the directory server, at least one of a homeDirectory request and a wWWHomePage request to the directory server;
receiving from the directory server, after transmitting at least one of the homeDirectory request and the wWWHomePage request, a plurality of pieces of attribute information associated with the account information including at least one of (1) a first character string indicating a location of a home folder on the network included in a response to the homeDirectory request and (2) a second character string indicating a location of a web page on the network included in a response to the wWWHomePage request;
displaying, on the display device, a protocol selection screen for selecting a communication protocol which is used to transmit image data to a destination;
displaying, on the display device, an attribute information selection screen for selecting attribute information, wherein the attribute information selection screen includes a plurality of pieces of target attribute information, which is a plurality of pieces of attribute information associated with the communication protocol selected from the protocol selection screen among a plurality of pieces of candidate attribute information including the plurality of pieces of attribute information received from the directory server and the user attribute information stored in the storage device, and does not include attribute information associated with a communication protocol which is different from the communication protocol selected from the protocol selection screen among the plurality of pieces of candidate attribute information;
in a case where the communication protocol selected from the protocol selection screen is a first communication protocol which is indicated by type-1 information, transmitting image data to the location which is indicated by target attribute information selected from the attribute information selection screen and including the type-1 information as a first destination using the first communication protocol, and not transmitting the image data to the location which is indicated by the target attribute information as the first destination using a second communication protocol, the second communication protocol being indicated by type-2 information different from the type-1 information and being different from the first communication protocol; and
in a case where the communication protocol selected from the protocol selection screen is the second communication protocol, transmitting image data to the location indicated by target attribute information selected from the attribute information selection screen and including the type-2 information as a second destination that is different from the first destination using the second communication protocol,
wherein the target attribute information selected from the attribute information selection screen and including the type-1 information includes at least one of the first character string and the second character string; and
wherein the target attribute information selected from the attribute information selection screen and including the type-2 information includes at least one of the first character string and the second character string.

10. The image processing apparatus according to claim 9,
wherein the receiving the plurality of pieces of attribute information includes receiving first attribute information including a character string indicating the location of the home folder and second attribute information including a character string indicating the location of the web page, and
wherein the transmitting the image data includes:
   determining whether the first attribute information and the second attribute information include the same type of information among the type-1 information and the type-2 information; and
   transmitting the image data to the location of the home folder indicated by the character string, without transmitting the image data to the location of the web page indicated by the character string, in response to determined that the first attribute information and the second attribute information include the same type of information among the type-1 information and the type-2 information.

11. The image processing apparatus according to claim 9,
wherein the type-1 information is information indicating a file transfer service, and
wherein the type-2 information is information indicating a file sharing service.

12. The image processing apparatus according to claim 9,
wherein the type-1 information includes at least one character string of "/ (slash)", "ftp://", "ftps://", "sftp://", "http://", and "https://", and
wherein the type-2 information includes at least one character string of "¥ (yen symbol)", "\ (backslash)", and "file://".

13. The image processing apparatus according to claim 9,
wherein the first communication protocol includes at least one communication protocol of "FTP", "FTPS", "SFTP", "HTTP", "HTTPS", "CIFS", and "SMB", and
wherein the second communication protocol includes at least one communication protocol other than the first communication protocol out of the seven communication protocols.

14. The image processing apparatus according to claim 9 further comprising:
   a scanner unit that optically scans a document and generates image data representing the document,
   wherein the transmitting the image data includes transmitting the image data generated by the scanner unit.

15. A non-transitory computer readable recording medium storing computer readable instructions for an information processing apparatus that is provided with a processor and a communication interface that is connected to a network and communicates with a directory server through the network, wherein the instructions, when executed by the processor, causing the information processing apparatus to perform:
   receiving user attribute information input by the user;
   storing the user attribute information in the storage device;
   transmitting account information to the directory server through the communication interface for authentication by the directory server;
   receiving a plurality of pieces of attribute information from the directory server when the account information is authenticated by the directory server, each of the plurality of pieces of attribute information being associated with the account information by the directory server and indicating a location in the network;
   displaying, on a display device, a protocol selection screen for selecting a communication protocol which is used to transmit image data to a destination;
   displaying, on the display device, an attribute information selection screen for selecting attribute information, wherein the attribute information selection screen includes a plurality of pieces of target attribute information, which is a plurality of pieces of attribute information associated with the communication protocol selected from the protocol selection screen among a plurality of pieces of candidate attribute information including the plurality of pieces of attribute information received from the directory server and the user attribute information stored in the storage device, and does not include attribute information associated with a communication protocol which is different from the communication protocol selected from the protocol selection screen among the plurality of pieces of candidate attribute information;
   in a case where the communication protocol selected from the protocol selection screen is a first communication protocol which is indicated by type-1 information, transmitting image data to the location which is indicated by target attribute information selected from the attribute information selection screen and including the type-1 information as a first destination using the first communication protocol, and not transmitting the image data to the location which is indicated by the target attribute information as the first destination using a second communication protocol, the second communication protocol being indicated by type-2 information different from the type-1 information and being different from the first communication protocol; and
   in a case where the communication protocol selected from the protocol selection screen is the second communication protocol, transmitting image data to the location which is indicated by target attribute information selected from the attribute information selection screen and including the type-2 information as a second destination that is different from the first destination using the second communication protocol, and not transmitting the image data to the location which is indicated by the target attribute information as the second destination using the first communication protocol.

* * * * *